(12) United States Patent
O'Brien et al.

(10) Patent No.: US 8,890,364 B2
(45) Date of Patent: Nov. 18, 2014

(54) METHODS AND SYSTEMS FOR CONTROLLING AN INTRA-PLANT VOLTAGE LEVEL

(75) Inventors: Kathleen Ann O'Brien, Niskayuna, NY (US); Ralph Teichmann, Niskayuna, NY (US); Jovan Z Bebic, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 518 days.

(21) Appl. No.: 13/333,393

(22) Filed: Dec. 21, 2011

(65) Prior Publication Data

US 2013/0162047 A1 Jun. 27, 2013

(51) Int. Cl.
*H02J 1/00* (2006.01)

(52) U.S. Cl.
USPC .......................................................... 307/82

(58) Field of Classification Search
USPC ............................................................ 307/82
See application file for complete search history.

(56) References Cited

U.S. PATENT DOCUMENTS

| | | | |
|---|---|---|---|
| 5,343,139 A | 8/1994 | Gyugyi et al. | |
| 5,610,501 A * | 3/1997 | Nelson et al. | 323/207 |
| 6,963,187 B2 | 11/2005 | Bebic et al. | |

* cited by examiner

*Primary Examiner* — Robert L. Deberadinis
(74) *Attorney, Agent, or Firm* — Paul J. DiConza

(57) ABSTRACT

A power plant coupled to, and configured to provide power to, an electrical grid, is described. The power plant includes a plurality of power converters electrically coupled to, and configured to receive power from, at least one power source. The power plant also includes a voltage regulation device electrically coupled between the power converters and the electrical grid. The voltage regulation device includes a series transformer and a bi-directional converter configured to regulate a voltage at an output of the power converters.

20 Claims, 3 Drawing Sheets

METHODS AND SYSTEMS FOR CONTROLLING AN INTRA-PLANT VOLTAGE LEVEL

BACKGROUND OF THE INVENTION

The embodiments described herein relate generally to power generation, and more specifically, to methods and systems for controlling an intra-plant voltage level within a renewable energy based power plant.

Light and wind are examples of renewable sources of energy that are increasingly becoming attractive alternative sources of energy. Solar energy in the form of sunlight may be converted to electrical energy by solar cells. A more general term for devices that convert light to electrical energy is "photovoltaic cells." A plurality of solar cells may be coupled together into solar modules. Solar modules may also be coupled together to provide a desired level of power, which is referred to herein as a solar farm. Wind energy may be converted to electrical energy using a wind turbine generator. Wind turbine generators typically include a rotor having multiple blades that transform wind energy into rotational motion of a drive shaft, which in turn is utilized to drive an electric generator. A plurality of wind turbine generators may be coupled together to provide a desired level of power and are referred to herein as a wind farm.

Power plants, including solar farms and wind farms, typically deliver their produced power to customers over an electrical grid. Electricity applied to the electrical grid is required to meet grid connectivity expectations. These requirements address safety issues as well as power quality concerns. For example, the grid connectivity expectations include operating the power generation system during a transient event, also referred to herein as a grid fault event. This capability may be referred to as low voltage ride through (LVRT) or zero voltage ride through (ZVRT). An LVRT/ZVRT event is a condition where the alternating current (AC) utility voltage is low on either one phase of the electrical grid or multiple phases of the electrical grid. During an LVRT/ZVRT event, the capacity of the electrical grid to accept power from the power generation system is low, a condition also referred to herein as a "weak grid".

Furthermore, the efficiency of the power conversion performed by inverters included within typical solar farms and wind farms is dependent upon the grid voltage. The grid voltage is not constant, but rather, may vary depending on, for example, other loads coupled to the electrical grid and/or other power generation systems coupled to the electrical grid. Typically, a solar farm is expected to provide full power without curtailments when the grid voltage is within a predefined tolerance of a nominal grid voltage. For example, a regulation may include a requirement that a solar farm coupled to the electrical grid provide full power to the electrical grid when the grid voltage is ±10% of the nominal grid voltage. The predefined tolerance may also be higher, for example, ±15-20% of the nominal grid voltage. Typical solar farm and wind farm inverters require a wide voltage tolerance band in order to provide power that matches the varying grid voltage. The wide grid voltage range limits the efficiency of the power conversion performed by solar/wind farm inverters and may increase the cost of the solar/wind farm inverters.

BRIEF DESCRIPTION OF THE INVENTION

In one aspect, a power plant coupled to, and configured to provide power to, an electrical grid, is provided. The power plant includes a plurality of power converters electrically coupled to, and configured to receive power from, at least one power source. The power plant also includes a voltage regulation device electrically coupled between the power converters and the electrical grid. The voltage regulation device includes a series transformer and a bi-directional converter configured to regulate a voltage at an output of the power converters.

In another aspect, a method for controlling a voltage regulation device included within a power generation system is provided. The power generation system is configured to provide power to an electrical grid. The voltage regulation device is coupled in series with a power converter that is configured to provide power to the voltage regulation device. The method includes monitoring an input voltage provided to an input of the power converter. The method also includes maintaining a voltage at an output of the power converter within a predefined tolerance of a voltage level that is proportional to the input voltage.

In yet another aspect, a voltage regulation device coupled to, and configured to provide power to, an electrical grid, is provided. The voltage regulation device includes a first transformer configured for coupling to an output of at least one power converter and a bi-directional power converter coupled to the first transformer. The voltage regulation device also includes a second transformer coupled between the bi-directional power converter and the electrical grid. The voltage regulation device also includes a converter controller communicatively coupled to the bi-directional power converter and configured to control operation of the bi-directional power converter.

DETAILED DESCRIPTION OF THE INVENTION

The methods and systems described herein facilitate controlling an intra-plant voltage level within a power plant. More specifically, the power plant may include a power source, a plurality of power converters, and a voltage regulation device. The voltage regulation device controls a voltage at an output of the power converters. In a solar farm that includes a plurality of power generation systems, the voltage regulation device controls an intra-plant alternating current (AC) distribution voltage. For example, the intra-plant AC distribution voltage may be regulated to follow the minimum voltage needs of a power source, for example, a solar panel. Furthermore, reactive power regulation is performed at the point of coupling to the electrical grid. Control of the intra-plant AC voltage facilitates increasing efficiency of the solar farm by reducing inverter and/or distribution equipment losses. Moreover, control of the intra-plant AC voltage may also facilitate reducing the cost of the power generation system as distribution equipment and inverters can be optimized for a narrower operating parameter range.

Figure 1:
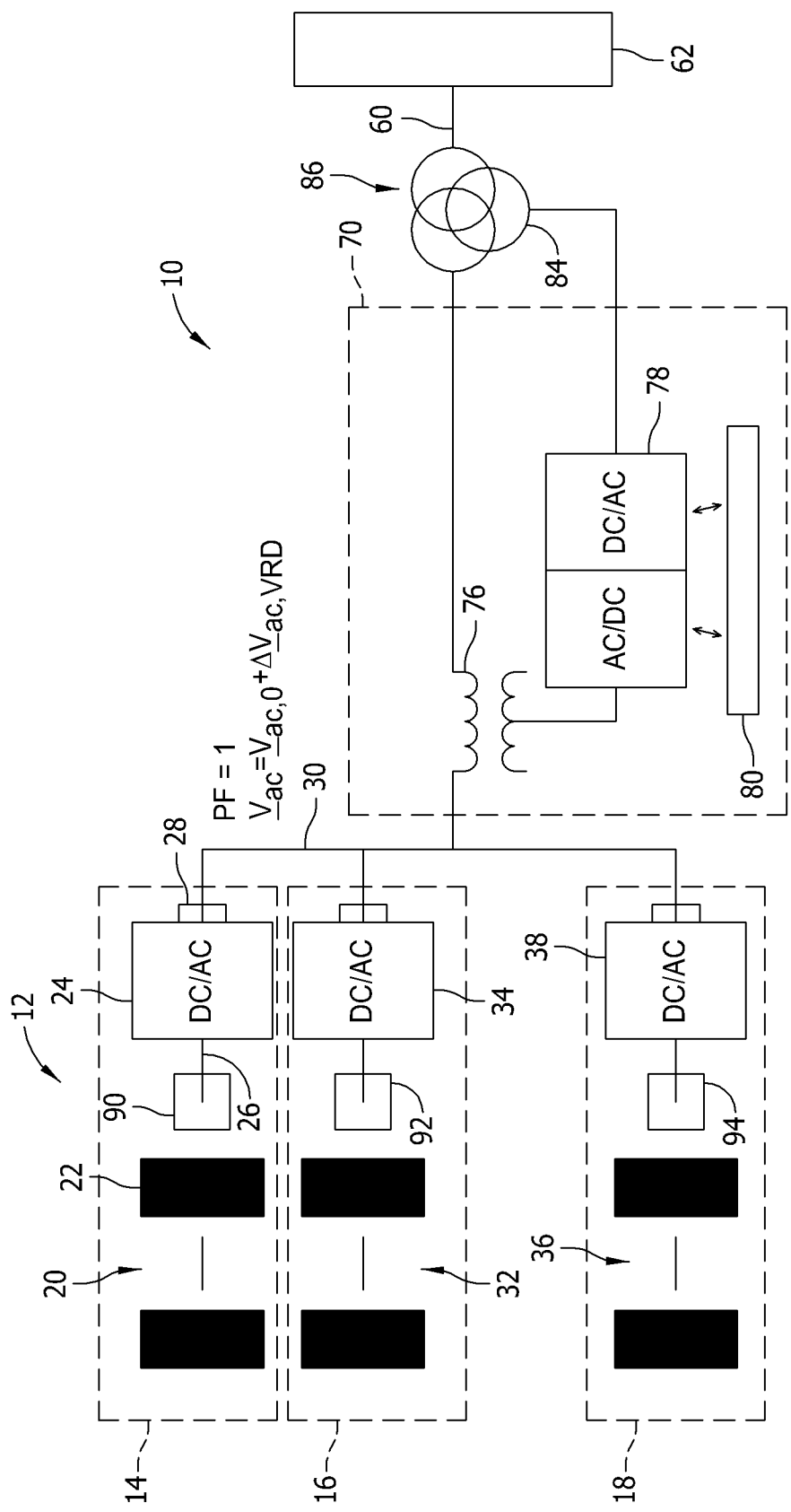
FIG. 1 is a block diagram of a power plant that includes an exemplary voltage regulation device.

FIG. 1 is a block diagram of an exemplary embodiment of a power plant, for example, a solar farm 10. In the exemplary embodiment, solar farm 10 includes a plurality of photovoltaic (PV) power generation systems 12, for example, a first power generation system 14, a second power generation system 16, and a third power generation system 18. Although described as including three power generation systems, solar farm 10 may include any number of power generation systems that allows solar farm 10 to function as described herein.

In the exemplary embodiment, first power generation system 14 includes a power source 20. For example, power source 20 may include a PV array 22 that outputs a direct current (DC) voltage. PV array 22 includes at least one PV cell (not shown in FIG. 1), for example, at least one solar cell. Typically, solar cells are coupled to form a solar array, also referred to as a solar module, and multiple solar modules are coupled to form a module string. The solar cells are arranged in this manner to increase the voltage and current output by the solar array. In the exemplary embodiment, first power generation system 14 also includes a power converter 24 having a power converter input 26. For example, power converter 24 may include a DC to AC inverter configured to receive the DC output voltage of power source 20 at input 26 and to output an AC voltage. Power converter 24 may also include, or be coupled to, an AC transformer 28 to adjust a voltage level obtained by inversion of voltage at power converter input 26 to a voltage level at an output 30 of power generation system 14. Similarly, second power generation system 16 includes a power source 32 and a power converter 34. Third power generation system 18 includes a power source 36 and a power converter 38. Although described herein as receiving power generated by PV array 22, power converter 24 may be provided with power from any suitable DC source that allows first power generation system 14 to function as described herein.

Solar farm 10 is configured to provide an AC output voltage at a point of interconnection 60 to an electrical grid 62. For example, solar farm 10 may be configured to output fifty megawatts of power to electrical grid 62. Electrical grid 62 may include an electrical load and/or an electrical distribution grid, an electrical transmission grid, or any type of electrical grid configured for delivering electricity.

In the exemplary embodiment, solar farm 10 also includes a voltage regulation device 70 coupled in series with the plurality of PV power generation systems 12 and electrical grid 62. More specifically, voltage regulation device 70 is coupled between output 30 of power generation systems 14, 16, and 18 and electrical grid 62. In the exemplary embodiment, voltage regulation device 70 includes a transformer 76, a bi-directional power converter 78, and a converter controller 80. Converter controller 80 is communicatively coupled to power converter 78 and configured to control power converter 78. In the illustrative embodiment, voltage regulation device 70 is positioned near a transformer 86. Transformer 86 may be referred to as a main transformer and/or a grid-level transformer. For example, voltage regulation device 70 is positioned closer to transformer 86 than it is to power generation systems 14, 16, and 18. The distance between voltage regulation device 70 and power generation systems 14, 16, and 18 may be substantial. For example, a fifty megawatt solar farm may cover more than three hundred acres of land. Transformer 28 adjusts a voltage level obtained by inversion of voltage at power converter input 26 to a voltage level at an output 30 that is suitable for intra-plant power distribution.

Voltage regulation device 70 is coupled to transformer 86. More specifically, bi-directional power converter 78 may be coupled to a tertiary winding 84 of transformer 86. In the illustrative embodiment, voltage regulation device 70 is rated at a predefined fraction of a total power output rating of solar farm 10. For example, the power rating of voltage regulation device 70 may be in a range of 10%-20% of the total power output rating of solar farm 10.

In the exemplary embodiment, voltage regulation device 70 controls a voltage at output 30 of power generation systems 14, 16, and 18. In other words, voltage regulation device 70 controls a voltage seen at output 30 by power generation systems 14, 16, and 18. The voltage at output 30 is also referred to herein as an intra-plant distribution voltage. As described above, how efficiently power converters 24, 34, and 38 operate is dependent upon the voltage at output 30, and more specifically, upon a difference between voltage provided to power converters 24, 34, and 38 and the voltage at output 30. For example, power converters 24, 34, and 38 operate most efficiently when the voltage provided to power converters 24, 34, and 38 is proportional to the peak of AC voltage at output 30. Efficient operation of power converters 24, 34, and 38 allows for the most efficient power generation as well as reduces an amount of heat generated by converters 24, 34, and 38.

In the exemplary embodiment, power generation system 14 also includes a measurement device 90 that measures a voltage at input 26 of power converter 24. Alternatively, measurement device 90 may measure a power level, a current level, and/or any other measurement at input 26 that allows a voltage at input 26 to be determined. Furthermore, in the exemplary embodiment, power generation system 16 includes a measurement device 92 and power generation system 18 includes a measurement device 94. The voltage at input 26 of power converter 24 may also be referred to as the voltage output of power source 20. Measurement device 90 generates an input voltage signal corresponding to the voltage at input 26 and provides the input voltage signal to voltage regulation device 70. Measurement device 90 may be communicatively coupled to voltage regulation device 70 in any manner, for example, using wired communication and/or wireless communication, that allows solar farm 10 to function as described herein. In the exemplary embodiment, voltage regulation device 70, and more specifically, converter controller 80, receives the voltage input signal and controls the voltage at output 30 to remain substantially proportional to the input voltage associated with the voltage input signal. In other words, the voltage at output 30 is regulated to substantially follow the voltage at input 26.

In the exemplary embodiment, the voltage at output 30 is a vectorial sum of the actual grid voltage and a voltage imposed by voltage regulation device 70. The voltage at output 30 ($V_{ac}$) may be described as:

$$V_{ac} = V_{ac,0} \pm \Delta V_{ac,\ VRD} \qquad \text{Formula 1}$$

wherein $V_{ac,0}$ is the grid voltage and $\Delta V_{ac,\ VRD}$ is the change in voltage caused by voltage regulation device 70. In the exemplary embodiment, voltage regulation device 70 maintains the voltage at output 30 within a first predefined tolerance of a voltage level that is proportional to the voltage at input 26. For example, voltage regulation device 70 may maintain the voltage at output 30 within a range of 1% to 5% of a voltage level that is proportional to the voltage at input 26 of power converter 24. As described above, the grid voltage may vary from a nominal grid voltage rating by more than ±15%. A voltage operating range of power converter 24 may be reduced since the range of voltages seen by converter 24 at output 30 is reduced by voltage regulation device 70. Power converters having a narrower operating range are typically less expensive than power converters having a wider operating range.

In the exemplary embodiment, voltage regulation device 70 maintains the voltage at output 30 within the first predefined tolerance of the a voltage level that is proportional to the voltage provided to power converter 24 by controlling a magnitude and/or phase angle of the voltage at output 30. Controlling the magnitude and/or phase angle of the voltage at output 30 controls an effective voltage at output 30.

Voltage regulation device 70 may create a line voltage drop between converters 24, 34, and 38 and electrical grid 62. The voltage drop reduces the voltage output of solar farm 10 without curtailing operation of power generation systems 14, 16, and 18. For example, when a transient event occurs, such as a grid contingency event where the grid voltage decreases to approximately zero volts, the output voltage of solar farm 10 is reduced through operation of voltage regulation device 70. More specifically, during the grid contingency event, voltage regulation device 70 maintains the voltage at output 30 at a level that allows power converter 24 to continue operating while an output voltage of voltage regulation device 70 is reduced to approximately zero volts. Power output from power converters 24, 34, and 38 may be reduced to zero, however, maintaining a voltage at output 30 assists in keeping converters 24, 34, and 38 in service. As the grid voltage recovers from the grid contingency event, the output voltage of voltage regulation device 70 is gradually reduced and voltage at output 30 is restored to a normal operating mode where voltage at output 30 tracks the voltage at the converter inputs, for example, input 26.

Voltage regulation device 70 may also create a line voltage increase between converters 24, 34, and 38 and electrical grid 62. The voltage increase increases the voltage output of solar farm 10 when compared to the voltage at output 30. For example, in the morning, power converter 24 is typically operated at partial power since the DC output of power source 22 is low and the output voltage of power converter 24 is the nominal grid voltage. This is a high DC to AC conversion ratio which leads to inefficient power converter 24 operation. Since voltage regulation device 70 can add additional line voltage, power converter 24 may be operated to output a lower than nominal AC voltage, which reduces the DC to AC conversion ratio and increases the efficiency of power converter 24 operation. Furthermore, when the grid voltage is transiently high, the voltage at output 30 is reduced to a value that is equal to or lower than the voltage at input 26 to safeguard power converter 24 from potential damage.

Additionally, voltage regulation device 70 provides reactive power regulation. For example, power factor correction may be performed by voltage regulation device 70. Typically, power factor correction is performed by the power converters in a solar farm. By off-loading the power factor correction to voltage regulation device 70, the power factor correction may be wider in range than individual power converters are capable of providing. Furthermore, the power factor correction may be more accurate than power factor correction provided by individual power converters since the correction is being performed at the point of common coupling between solar farm 10 and electrical grid 62. The distance between the individual power converters and electrical grid 62 may be large enough to adversely effect the power factor correction performed at the individual power converters. The available range of power factor control can be further increased by including mechanically or statically switched capacitors and inductors within voltage regulation device 70 and coordinating their control with the control of power converter 78.

Furthermore, voltage regulator 70 is fail-safe. For example, if voltage regulation device 70 were to fail, solar farm 10 would continue to operate as if it did not include voltage regulation device 70, that is, without the benefits provided by voltage regulation device 70 and possibly slightly derated.

Figure 2:
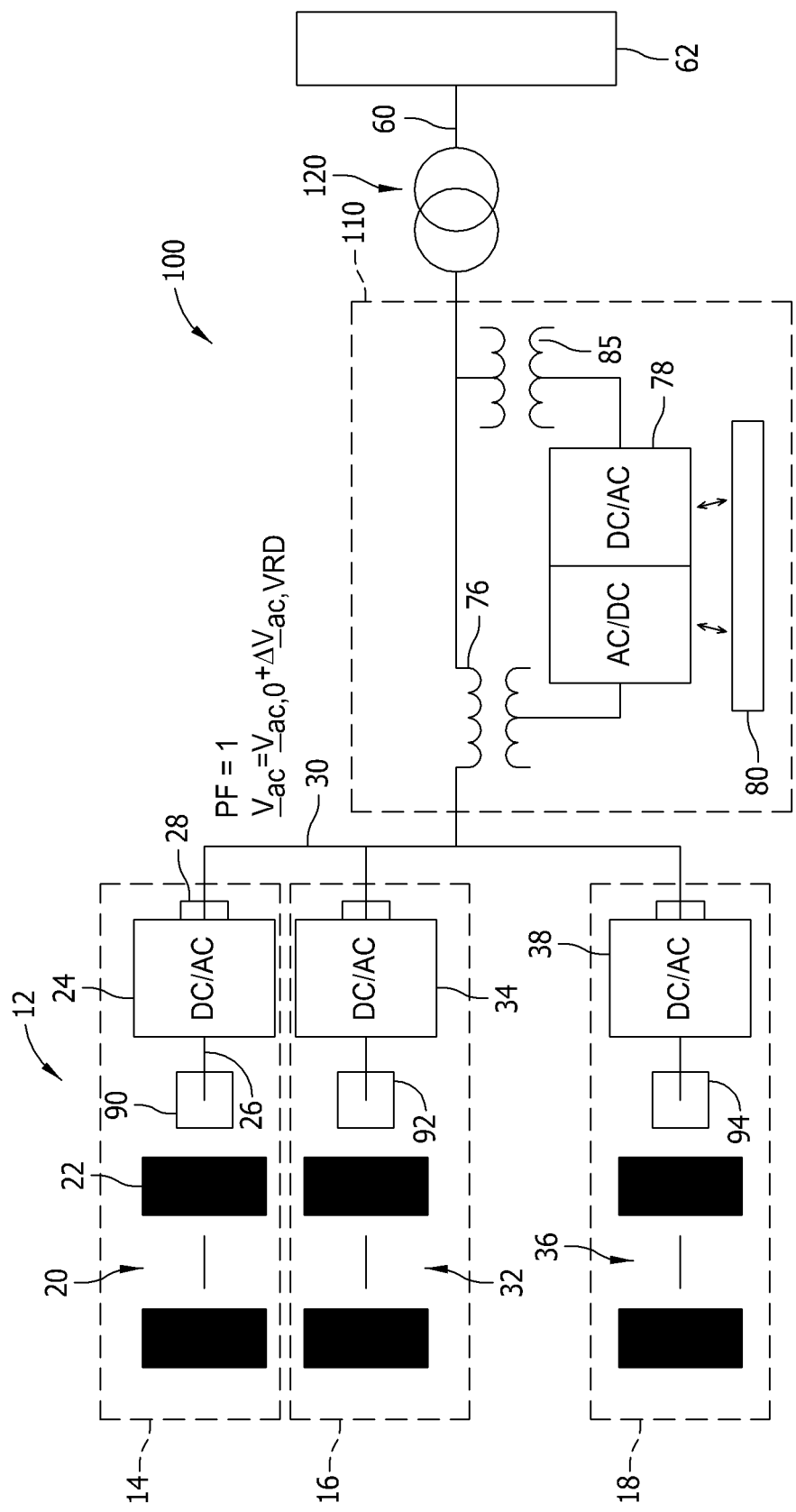
FIG. 2 is a block diagram of a power plant that includes an alternative voltage regulation device.

FIG. 2 is a block diagram of a power generation system 100 that includes an alternative embodiment 110 of voltage regulation device 70 (shown in FIG. 1). In the alternative embodiment, voltage regulation device 110 is a retrofit device that maybe added to an existing power generation system 100 to obtain the benefits provided by voltage regulation device 70. Components shared between voltage regulation device 110 and voltage regulation device 70 are identified with identical reference numerals. In the alternative embodiment, power generation system 100 includes a transformer 120 that does not include a tertiary winding. To facilitate installation of voltage regulation device 110 into power generation system 100, a shunt transformer 85 is included within voltage regulation device 110.

Figure 3:
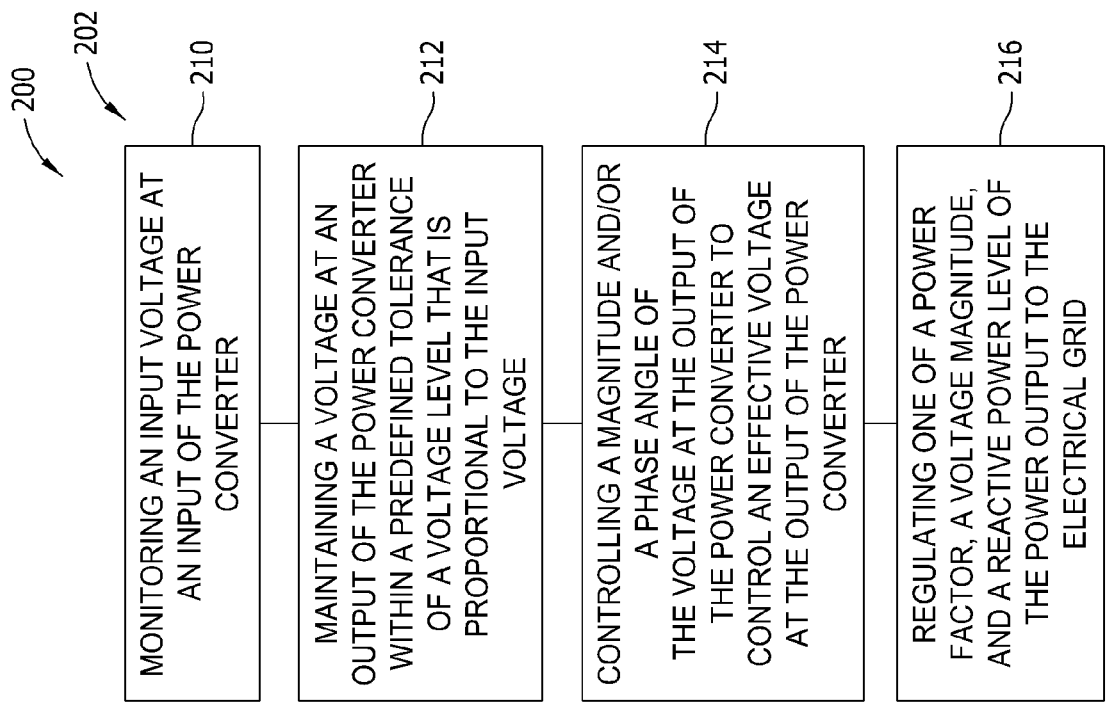
FIG. 3 is a flow chart of an exemplary method for controlling a voltage regulation device included within a power plant.

FIG. 3 is a flow chart 200 of an exemplary method 202 for controlling a voltage regulation device, for example, voltage regulation device 70 (shown in FIG. 1). For example, method 202 may be performed by a system controller, for example, controller 80 (shown in FIG. 1), to control operation of voltage regulation device 70. In the exemplary embodiment, a solar farm, for example, solar farm 10 (shown in FIG. 1), provides power to an electrical grid, for example, electrical grid 62 (shown in FIG. 1). Voltage regulation device 70 is coupled in series with a power converter, for example, power converter 24 (shown in FIG. 1), which provides power to voltage regulation device 70.

In the exemplary embodiment, method 202 includes monitoring 210 an input voltage at an input of power converter 24. For example, a measurement device, for example, measurement device 90 (shown in FIG. 1), may monitor 210 the input voltage at input 26 of power converter 24. In the exemplary embodiment, method 202 also includes maintaining 212 a voltage at an output of power converter 24 within a predefined tolerance of the input voltage. For example, voltage regulation device 70 controls the voltage at output 30 to remain substantially proportional to the input voltage associated with the voltage input signal. More specifically, voltage regulation device 70 maintains 212 the voltage at output 30 within a first predefined tolerance of a voltage level proportional to the input voltage. Maintaining 212 the voltage at output 30 of power converter 24 within the first predefined tolerance may include controlling 214 a magnitude and/or a phase angle of the voltage at output 30 of power converter 24 to control an effective voltage at output 30.

Furthermore, controlling 214 the magnitude and/or phase angle of the voltage at output 30 of power converter 24 may include increasing the effective voltage at output 30 when compared to a grid voltage in response to a grid contingency event to allow for at least one of low voltage ride through and zero voltage ride through of the grid contingency event. Moreover, controlling 214 the magnitude and/or phase angle of the voltage at output 30 of power converter 24 comprises decreasing the effective voltage at output 30 when compared to a grid voltage in response to a grid overvoltage event to prevent tripping of power converter 24.

In the exemplary embodiment, method 202 may also include regulating 216, using voltage regulation device 70, a voltage magnitude, a reactive power output, or a power factor of power output to electrical grid 62.

It should be noted that the embodiments described herein are not limited to any particular system controller and/or processor for performing the processing tasks described herein. The terms "processor" or "controller", as used herein, are intended to denote any machine capable of performing the calculations, or computations, necessary to perform the tasks described herein. The terms "processor" or "controller" also are intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of embodiments of the invention, as will be understood by those skilled in the art. The terms processor and/or controller, as used herein, refers to central processing units, microprocessors, microcontrollers, reduced instruction set circuits (RISC), application specific integrated circuits (ASIC), logic circuits, and any other circuit or processor capable of executing the functions described herein.

Furthermore, unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

The above-described embodiments facilitate efficient and cost-effective operation of a solar farm. Although described with respect to a solar farm, the methods and systems described herein are not limited to the context of a solar farm. For example, the methods and systems described herein may also be applicable to wind farms and/or other types of grid connected renewable energy based power generation systems. The methods and systems described herein facilitate minimizing plant distribution losses and inverter losses while enabling operation of the solar farm through a wide grid voltage tolerance band. The methods and systems described herein may also facilitate ride through of a grid contingency or other transient event and improve stability of operation when providing power to a weak grid. Use of a cooling device to cool the inverter, for example, an active cooling device, may be eliminated or reduced due to more efficient inverter operation. Moreover, the methods and systems described herein may be retrofit into an existing solar farm to improve operation of the solar farm.

Exemplary embodiments of a power generation system that includes an intra-plant distribution voltage regulation device are described above in detail. The methods and systems are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power plant coupled to, and configured to provide power to, an electrical grid, said power plant comprising:
    a plurality of power converters electrically coupled to, and configured to receive power from, at least one power source;
    a voltage regulation device electrically coupled between said power converters and the electrical grid and comprising a series transformer and a bi-directional converter configured to regulate a voltage at an output of said power converters.

2. A power plant in accordance with claim 1, wherein said series transformer is electrically coupled to the output of said power converters and to said bi-directional converter.

3. A power plant in accordance with claim 2, further comprising a grid transformer electrically coupled between said voltage regulation device and the electrical grid.

4. A power plant in accordance with claim 3, wherein said grid transformer comprises a tertiary winding coupled to said bi-directional converter.

5. A power plant in accordance with claim 3, wherein said voltage regulation device further comprises a shunt transformer coupled between said bi-directional converter and said grid transformer.

6. A power plant in accordance with claim 1, wherein said voltage regulation device is rated at a predefined fraction of a total power output rating of said power plant.

7. A power plant in accordance with claim 6, wherein the predefined fraction is approximately 10% to 20% of the total power output rating of said power plant.

8. A power plant in accordance with claim 1, wherein said voltage regulation device is configured to:
    receive a reference signal corresponding to a DC voltage from at least one of an output of said power source and an input to at least one of said power converters; and
    regulate the voltage at the output of said power converters based at least partially on the reference signal.

9. A power plant in accordance with claim 8, wherein said voltage regulation device:
    maintains the voltage at the output of said power converters within a first predefined tolerance of a voltage level that is proportional to the DC voltage; and
    provides power to the electrical grid when a grid voltage is within a second predefined tolerance of a nominal grid voltage, and wherein the first predefined tolerance is less than the second predefined tolerance.

10. A power plant in accordance with claim 1, wherein the voltage at the output of said power converters is a vectorial sum of the actual grid voltage and a voltage imposed by said voltage regulation device.

11. A power plant in accordance with claim 1, wherein said voltage regulation device is further configured to regulate one of a voltage magnitude, a power factor, and a level of reactive power output to the electrical grid.

12. A method for controlling a voltage regulation device included within a power plant configured to provide power to an electrical grid, the voltage regulation device coupled in series with a power converter, the power converter configured to provide power to the voltage regulation device, said method comprising:

monitoring an input voltage provided to an input of the power converter; and maintaining a voltage at an output of the power converter within a predefined tolerance of a voltage level that is proportional to the input voltage.

13. A method in accordance with claim 12, further comprising at least one of increasing voltage and reducing voltage such that an output voltage of the voltage regulation device substantially equals a grid voltage.

14. A method in accordance with claim 12, wherein maintaining the voltage at the output of the power converter within a predefined tolerance of a voltage level that is proportional to the input voltage comprises controlling a magnitude and/or a phase angle of the voltage at the output of the power converter to control an effective voltage at the output of the power converter.

15. A method in accordance with claim 14, wherein controlling the magnitude and/or phase angle of the voltage at the output of the power converter comprises one of:

increasing the effective voltage at the output of the power converter when compared to a grid voltage in response to a grid contingency event to allow for at least one of low voltage ride through and zero voltage ride through of the grid contingency event; and decreasing the effective voltage at the output of the power converter when compared to a grid voltage in response to a grid overvoltage event to prevent tripping of the power converter.

16. A method in accordance with claim 12, further comprising regulating, using the voltage regulation device, one of a voltage magnitude, a reactive power output, and a power factor of power output to the electrical grid.

17. A voltage regulation device coupled to, and configured to provide power to, an electrical grid, said voltage regulation device comprising:

a first transformer configured for coupling to an output of at least one power converter;

a bi-directional power converter coupled to said first transformer;

a second transformer coupled between said bi-directional power converter and the electrical grid; and a converter controller communicatively coupled to said bi-directional power converter and configured to control operation of said bi-directional power converter.

18. A voltage regulation device in accordance with claim 17, wherein said bi-directional power converter is configured to maintain a voltage at the output of the at least one power converter proportional to a voltage received at an input of the at least one power converter.

19. A voltage regulation device in accordance with claim 17, wherein said bi-directional power converter is configured to:

maintain a voltage at the output of the at least one power converter during a grid transient event when a grid voltage is reduced to approximately zero volts; and maintain a voltage at the output of the at least one power converter at a level less than or equal to a voltage at an input of the at least one power converter during a grid transient event when a grid voltage is above a nominal grid voltage.

20. A voltage regulation device in accordance with claim 17, wherein said bi-directional power converter provides one of voltage regulation, power factor regulation, and reactive power regulation of power provided to the electrical grid.

* * * * *